United States Patent [19]

Rohr

[11] 3,970,901

[45] July 20, 1976

[54] METHOD AND APPARATUS FOR THE DETECTION OF SHORT CIRCUITS

[75] Inventor: André Rohr, Geneva, Switzerland

[73] Assignee: Societe Anonyme des Ateliers de Secheron, Geneva, Switzerland

[22] Filed: Dec. 6, 1974

[21] Appl. No.: 530,152

[30] Foreign Application Priority Data

Dec. 14, 1973 Switzerland.................... 17525/73

[52] U.S. Cl.................................. 317/49; 317/38; 317/33 SC
[51] Int. Cl.² ........................................ H02H 3/16
[58] Field of Search............ 317/49, 27 R, 38, 36 D, 317/33 SC, 31, 14 C, 50, 36 TD, 33 R; 307/235 R; 328/150, 132, 135

[56] References Cited

UNITED STATES PATENTS

| | | | |
|---|---|---|---|
| 3,317,795 | 5/1967 | Steen | 317/33 SC X |
| 3,419,757 | 12/1968 | Steen | 317/33 SC X |
| 3,558,986 | 1/1971 | Schleif et al. | 317/27 R |
| 3,634,730 | 1/1972 | Wilson | 317/33 SC X |
| 3,657,605 | 4/1972 | Hill | 317/36 TD |
| 3,796,918 | 3/1974 | DeForest et al. | 317/13 A |
| 3,822,399 | 7/1974 | Grund et al. | 328/151 X |
| 3,828,259 | 8/1974 | Riethmuller et al. | 328/151 |
| 3,836,790 | 9/1974 | Becker | 317/31 X |

Primary Examiner—J. D. Miller
Assistant Examiner—Patrick R. Salce
Attorney, Agent, or Firm—Oblon, Fisher, Spivak, McClelland & Maier

[57] ABSTRACT

A method for the detection of short circuits in electrical installations, in particular on railway contact wires, comprising: generating a signal corresponding to the derivative with respect to time of the monitored current, comparing the generated signal with at least one limit value, indicating a short circuit if the generated signal exceeds a limit value, monitoring the behavior of the monitored current for the occurrence of a criterion indicating the probability of a short circuit, triggering a replica signal corresponding to the behavior of the monitored current from the movement of occurrence onwards as a function of the probability criterion, comparing the replica signal with at least one limit value, and indicating a short circuit if the limit value is exceeded.

22 Claims, 9 Drawing Figures

METHOD AND APPARATUS FOR THE DETECTION OF SHORT CIRCUITS

BACKGROUND OF THE INVENTION

1. Field of the Invention

The invention concerns method and apparatus for the detection of short circuits in electrical installations, in particular on railway contact wires, whereby a signal corresponding to the derivative with respect to time of the monitored current is generated and compared with at least one limit value. If the signal exceeds a limit value, a short circuit is indicated.

2. Description of the Prior Art

Monitoring devices of the kind stated are known, whereby a signal proportional to the monitored current is itself monitored as to whether it exceeds a permissible limit value. Devices of this kind do not function correctly under operating conditions because service currents which are still acceptable are of the same order of magnitude as short-circuit currents. This is especially the case with the contact wires of electric railways, in particular direct-current systems, when several consumers (traction vehicles) impose a high and multiple load on a section of line between two power supply substations which are monitored with respect to the supply current. Under such circumstances, it is in general not the magnitude of the short-circuit currents which must be avoided, but the damage and risk of fire caused by the short circuits.

SUMMARY OF THE INVENTION

An object of the invention is therefore to create a method of detection and corresponding apparatus with the aid of which short circuits can be detected more reliably than is possible solely by comparing the monitored current with a preset limit value. The solution to this problem as embodied in the invention is based on the knowledge that to improve the monitoring of short circuits under the conditions stated above, one should first select defined operational states which with sufficiently high probability include all short-circuit states, or at least a large proportion of them, and also, in the interests of high reliability, include states which are in fact acceptable, i.e., are not short circuits. The operational states thus selected would then each be allocated to a defined initial state of the monitoring system, this initial state being independent of the actual current at that moment, and the short-circuit states within the operational states first selected could subsequently be subjected to more detailed selection independent of the preceding behavior of the current.

Accordingly, an object of the method of the invention is achieved in that the behavior of the monitored current is monitored for the occurrence of a criterion indicating the probability of a short circuit and a replica signal corresponding to the behavior of the monitored current from this moment of occurrence onwards is triggered as a function of this probability criterion, whereupon this replica signal is compared with at least one limit value and if the limit value is exceeded, this fact is used as an indication of a short circuit. For the short-circuit probability criterion, it is in turn advantageous to use the fact that a signal corresponding to the time derivative of the monitored current exceeds a limit value, because short circuits are in general associated with a comparatively steep rate of rise of current. The replica signal can conveniently be obtained through the time integration of a signal corresponding to the time derivative of the monitored current, integration commencing from a value independent of the monitored current and being initiated by the occurrence of the short-circuit probability criterion.

In an advantageous variant of the method of the invention, the replica signal used to obtain indication of a short circuit is compared with a limit value which is dependent in the same sense on the rate of rise of the monitored current following occurrence of the short-circuit probability criterion. This procedure allows very reliable more detailed short-circuit selection, since it is known that, for short circuits in general, the ratio of the current reached after a certain time to the maximum rate of rise of the current is higher than the corresponding ratio with increases in current caused by starting a single power unit or a number of units at short intervals.

The foregoing and other objects are attained in accordance with one aspect of the present invention through the provision of a monitoring circuit configuration with the following component parts:

a. a measuring-signal emitter with a current-differentiating element, connected to a current path of the installation to be monitored;

b. a limit-value switch which switches to an on-state when the measuring signal exceeds a limit value;

c. an integrator connected to the output of the measuring-signal emitter and having a switch which can be switched by the output of the limit-value switch between an off-state which sets the integrator to a preset initial value, and an on-state which starts the integration, according to whether the measuring signal has exceeded a limit value;

d. a limit-value emitter having its input actively connected to the output of the measuring-signal emitter, the supplying at its output at least one limit value dependent on a maximum value of the measuring signal and in the same sense;

e. a comparator stage connected to the output of the integrator and to the output of the limit-value emitter, this stage providing an indication of a short circuit when the time integral of the measuring signal exceeds the limit value.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
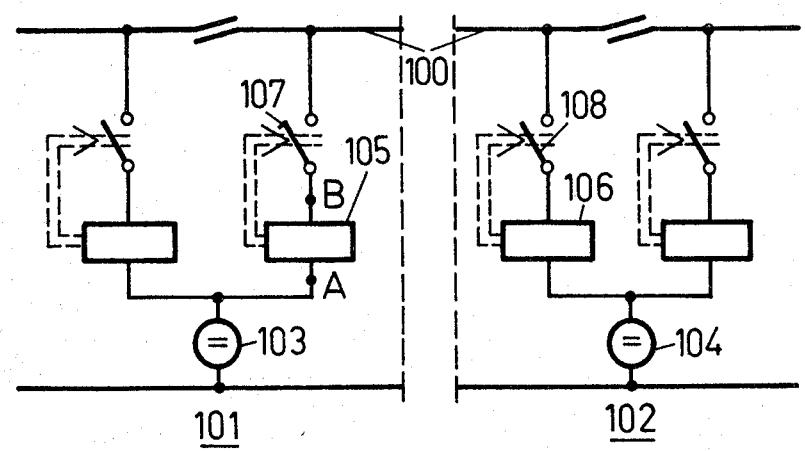
FIG. 1 shows a general arrangement of a section of contact wire having at each end power supply substations which are monitored for overcurrents.

Referring now to the drawings, wherein like reference numerals designate identical or corresponding parts throughout the several views, and more particularly to FIG. 1 thereof, FIG. 1 shows a section 100 of a d.c. contact wire system having at each end substations 101 and 102 and their associated d.c. power sources 103 and 104, respectively. For each end of the neighboring line sections, each substation incorporates a monitoring circuit 105 and 106, together with their respective circuit-breakers 107 and 108.

Figure 2:
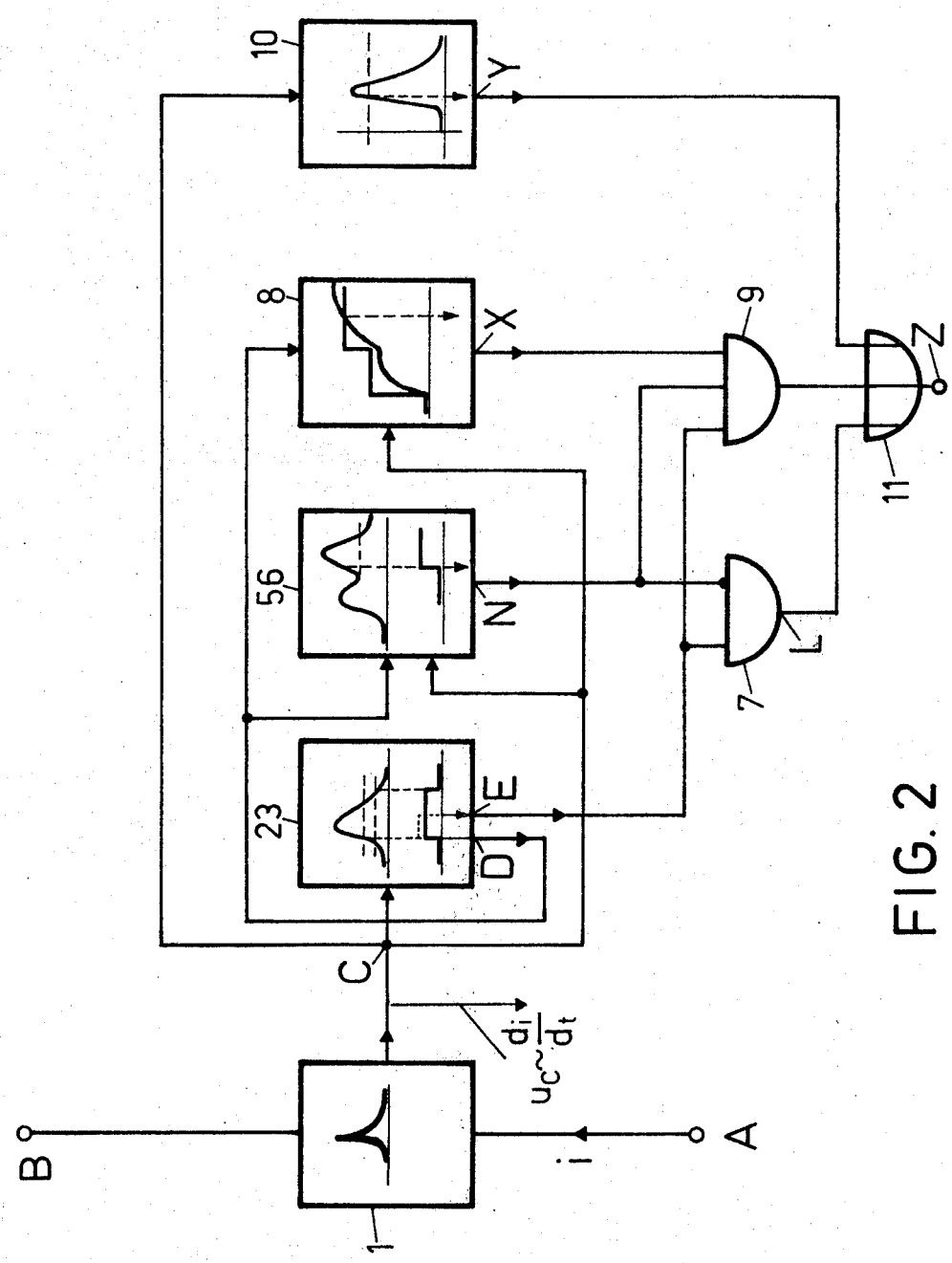
FIG. 2 is a basic circuit diagram of a device according to the invention with a combination of several examples of detection, based on different criteria, of short circuits and of still acceptable operational states.

In FIG. 2, a differential measuring-signal emitter 1 having as its output a measuring signal $u_c$ proportional to the time derivative of the current i, is coupled to the monitored circuit between points A and B. The measuring signal $u_c$ is fed to a conventional and simple limit-value switch 10 which supplies an indication of a short circuit at its output Y only in the event of station short circuit currents having a very high rate of rise, such as occur with short circuits in the vicinity of the power supply substations. The response value of this limit-value switch should therefore be set comparatively high, because otherwise an unacceptably high proportion of permissable operational states with currents having comparatively high rates of rise would be identified as short circuits and lead to unnecessary disconnections. On the other hand, with a rate-of-rise monitoring system of this kind alone, distant short circuits with a comparatively low rate of rise will not be detected, and so this form of supervision alone is not sufficient.

For this reason further monitoring elements are provided which allow more accurate discrimination between operational states and short-circuit conditions according to the duration and form of the differential measuring signal. Circuit sections 23 and 56, on the one hand, and circuit section 8, on the other hand, are provided for this purpose. The function of the first two of these is to detect short circuits according to the length of time for which the differential measuring signal $u_c$ exceeds the limit value, together with checking the behavior of $u_c$ for the occurrence of a second rise having passed through a first maximum followed by a minimum, the result of which is that although the length of time for which the limit value is exceeded is in itself unacceptable, it is still identified as being acceptable. In the event of such a second rise, the indication of a short circuit derived from the unacceptably long time for which the limit value has been exceeded, is therefore blocked. The reason for this is that superposing currents on each other at short intervals gives the impression of a short circuit, both as regards the maximum rate of rise of the current and also as regards the duration of the differential measuring signal. This is prevented by the combination of circuit sections 23 and 56, which is described in more detail below.

Circuit section 23 comprises essentially a limit-value switch and a time-comparator stage and is termed an overtime switch in the following. The limit-value switch supplies at its output D a binary signal equal in duration to the time for which the differential measuring signal $u_c$ exceeds the limit value, while the time-comparator stage, on expiration of a preset time interval, termed the reference interval in the following, which is compared with the time the measuring signal exceeds the limit value, emits at output E a binary signal denoting that the time the limit value has been exceeded is uncceptably long.

Circuit section 56 detects any secondary rise, and, in this event, supplies at its output N a continuous binary signal which, via the inverse input of an AND gate 7, blocks indication of a short circuit if the differential measuring signal from output E exceeds the limit value for longer than the permitted time. Thus, an effective indication of a short circuit appears at output L of AND gate 7 only if $u_c$ exceeds the limit value for an unacceptably long time and the curve of $u_c$ exhibits no secondary rise.

It is found in practice that the range of operating conditions with positive detection of a secondary rise can still include a certain proportion of short circuits, as for example when switching operations happen to coincide with a short circuit. For this reason, circuit section 8, termed the replica-signal limit-value switch in the following, provides an indicatin of a short circuit at its output X when a replica signal $u_b$ corresponding to the current i and, by way of example, derived through the integration of $u_c$, is compared with a limit-value function derived from the maximum rate of rise of the current and of the replica signal. This manner of short-circuit detection is based on the circumstances described at the beginning and supplies an indication of a short circuit via an AND gate 9 if the time $u_c$ exceeds the limit value is unacceptably long and a short circuit is present even though detection of a secondary rise is positive. The short-circuit indications supplied by circuit sections 23 and 56 and 8 and 10 are superposed disjunctively by means of an OR gate 11 and passed to the control output Z of the complete device.

The complete circuit shown in FIG. 2 constitutes an optimum combination of monitoring elements. In principle, however, an advantageous, and in many cases adequate, short circuit monitoring system can be achieved with certain individual elements and also with partial combinations of these elements. Under certain circumstances, for example, the replica-signal limit value switch 8 can be used as the sole short circuit detector, and in the case of more exacting security requirements, taking into account a correspondingly higher proportion of unncessary disconnections, a combination of the overtime switch 23 and the replica-signal limit-value switch 8 is also possible. A combination of the replica-signal limit-value switch 8 and the secondary-rise detector 56 may also be used to advantage, particularly when the limit values of the former are correspondingly critical, in which case a broad range of conditions is detected and the range of acceptable superposed switching operations is then excluded from this broad range.

Figure 3A:
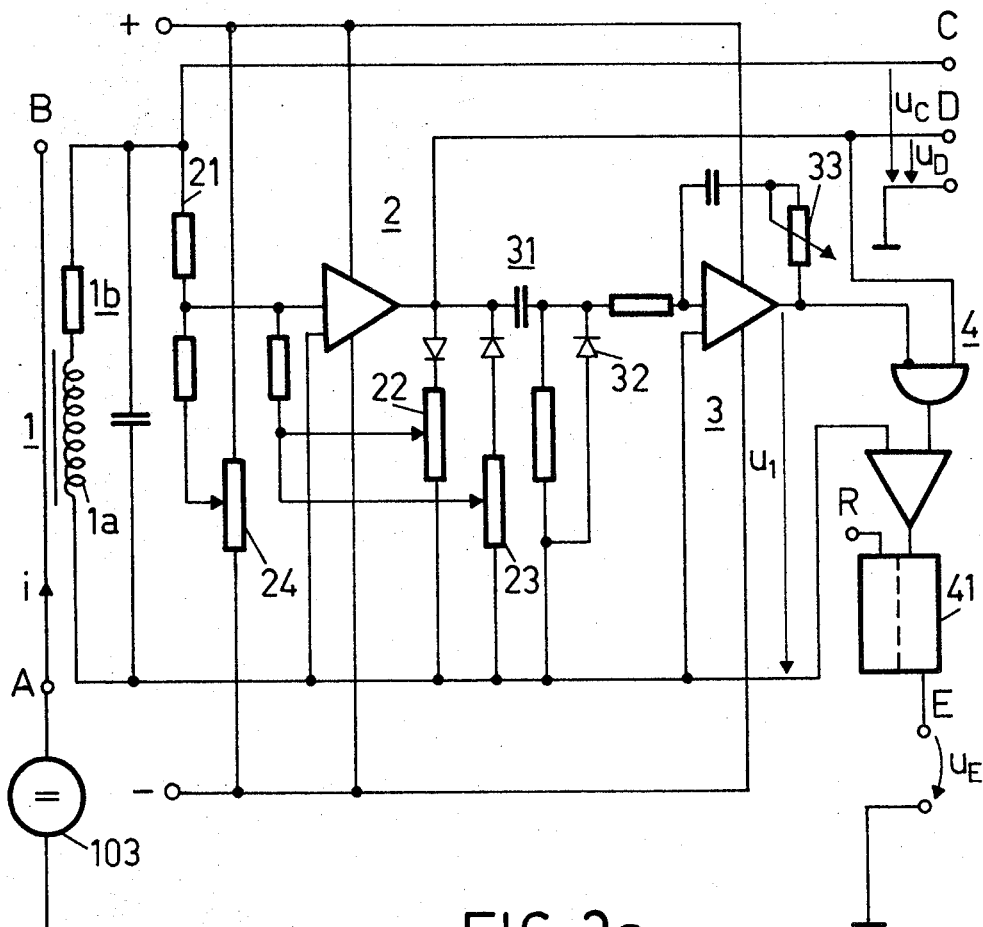
FIG. 3a is a circuit diagram of a differential measuring-signal emitter with limit-value switch and time-comparator stage, being a part of the complete circuit shown in FIG. 2.

The circuit is constructed as follows:

As shown in FIG. 3a, the measuring-signal emitter 1 comprises essentially a current-differentiating element 1a in the form of a current transformer, located betwen points A and B in FIG. 1. It detects the current i supplied from the direct-current source 103, and generates the measuring signal $u_C$. The latter is smoothed by a filter 1b and then passes to output C and to the input of limit-value switch 2. The latter comprises a bistable flip-flop with a d.c. voltage control input 21 and the usual hysteresis control characteristic, the upper and lower switching points of which an be adjusted with potentiometer 22 and potentiometer 23, respectively. Both switching points can be varied jointly by means of an input potentiometer 24. In total, therefore, the potentials of both switching points can be adjusted freely to the desired absolute values. Accordingly, a first, higher, limit value of the measuring signal serves as the switch-on point of the limit value switch, and a second, lower, limit value of the measuring signal serves as the switch-off point. The limit value switch is in the off-state before the measuring signal rises above the first limit value and after it falls below the lower limit value; between these it is in the on-state. Consequently, a rectangular pulse equal in duration to the time the measuring signal exceeds the limit value is produced at output D of the limit-value switch.

The input of the subsequent time-comparator stage 3 is generated by a differentiating element 31 with diode 32, which passes on only the positive initial pulse when the limit value is exceeded. Further to this, the time-comparator stage comprises a monostable flip flop with an on-time, adjustable with potentiometer 33, as a reference interval $T_r$. Thus the monostable flip flop is turned on at the beginning of the time the limit value is exceeded, and switches back when the preset reference interval has elapsed. An AND gate 4, with an inverse input connected to the time-comparator stage and a normal input connected to the limit value switch, supplies an affirmative signal on the output side only when the limit value switch is still in the on-state, whereas the time-comparator stage has already returned to the off-state, i.e., when the time for which the limit value has been exceeded is longer than the reference interval. In this case a bistable flip flop 41 is turned on and provides at its output E a short-circuit indication signal $u_E$ which is further processed in conjunction with detection of a secondary rise. Flip flop 41 is turned off again at a suitable moment by means of a reset input R.

Figure 3B:
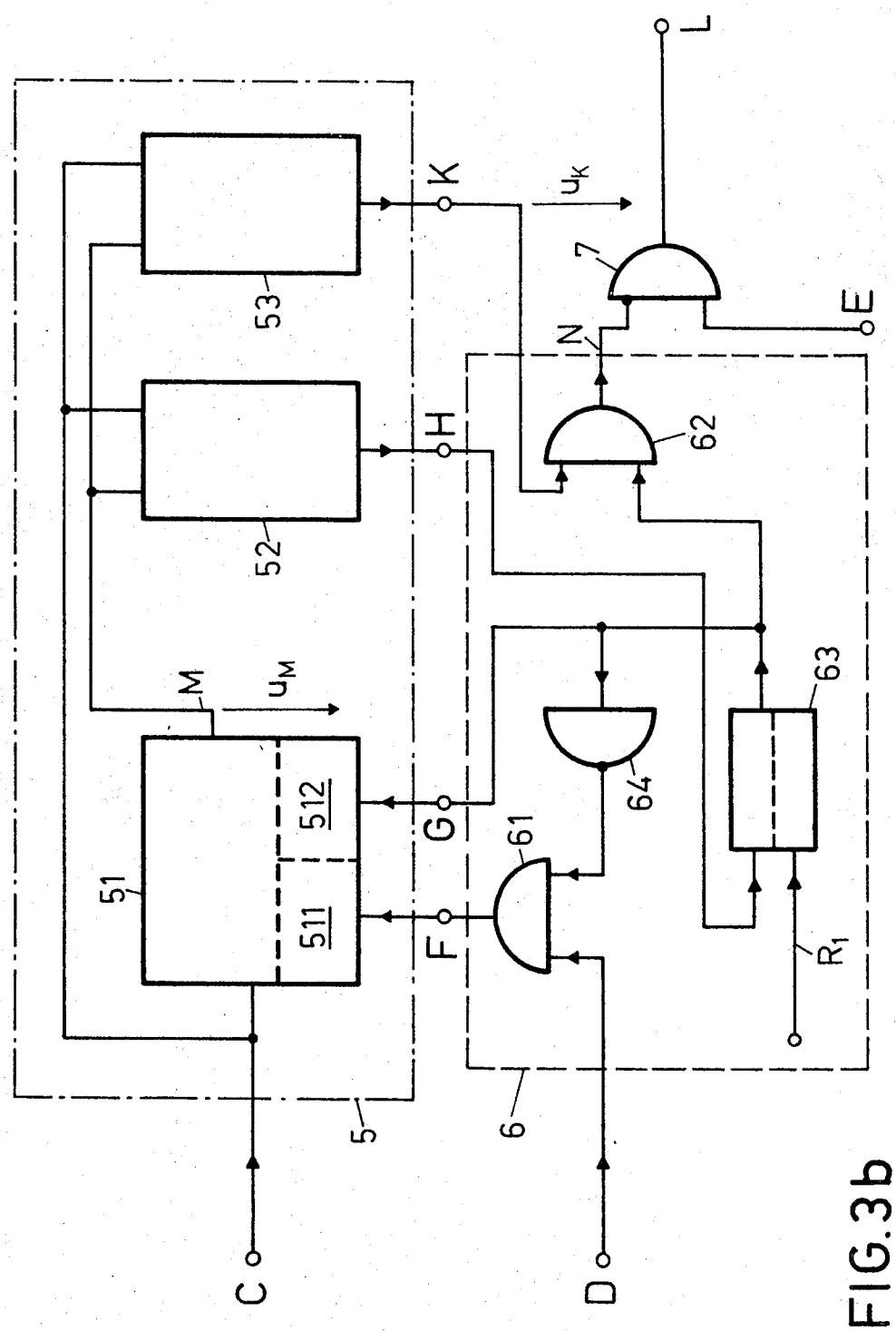
FIG. 3b is a block circuit diagram of a subsequent extreme-value detector with its associated control circuit.

The circuit section shown in FIG. 3b comprises an extreme-value detector 5 with signal sequence circuit 51, which is fed with the measuring signal $u_C$ from point C, and also a descent detector 52 and an ascent detctor 53. The outputs H and K, respectively, of these detectors modulate a control circuit 6 which in addition receives the signal "limit value exceeded" $u_D$ from point D of FIG. 3a and in turn modulates two follow-up circuits 511 and 512 of signal-sequence circuit 51 via two outputs F and G, respectively, and also drives an AND gate 7 for supervising the short circuit indication signal $u_E$.

The control circuit 6 comprises two AND gates 61 and 62, and also an inverter 64 and a bistable flip flop 63 with a reset input $R_1$. The flip flop 63 assumes the off-state before $u_D$ arrives, so that the AND gate 61 is made ready via the inverter and the commencement of the time the limit value is exceeded has the effect of blocking the follow-up circuit 511 responsible for following a decrease in $u_C$. At the subsequent first descent of $u_C$, therefore, the sequential signal $u_M$ appearing at output M of signal-sequence circuit 51 is held until a preset difference is reached, whereupon th descent detector 52 responds and turns on the flip flop 63 via output H. In this way, AND gate 61 is blocked and follow-up circuit 511 is released. The sequential signal $u_M$ then again becomes equal to $u_C$ and is held at the first minimum by the follow-up circuit 512, which is responsible for following an increase in $u_C$ and is blocked via the output G of control circuit 6, until a present difference is reached once more and the ascent detector 53 responds. The latter supplies a blocking signal $u_K$ via output K which is passed via AND gate 62, made ready by detection of a descent, to output N and thus serves as indication of a short circuit. This short circuit indication signal, acting via the inverse input of the AND gate 7 shown in FIG. 2, blocks the short circuit indication signal from output E produced when $u_C$ exceeds the limit value for an unacceptably long time.

Figure 3C:
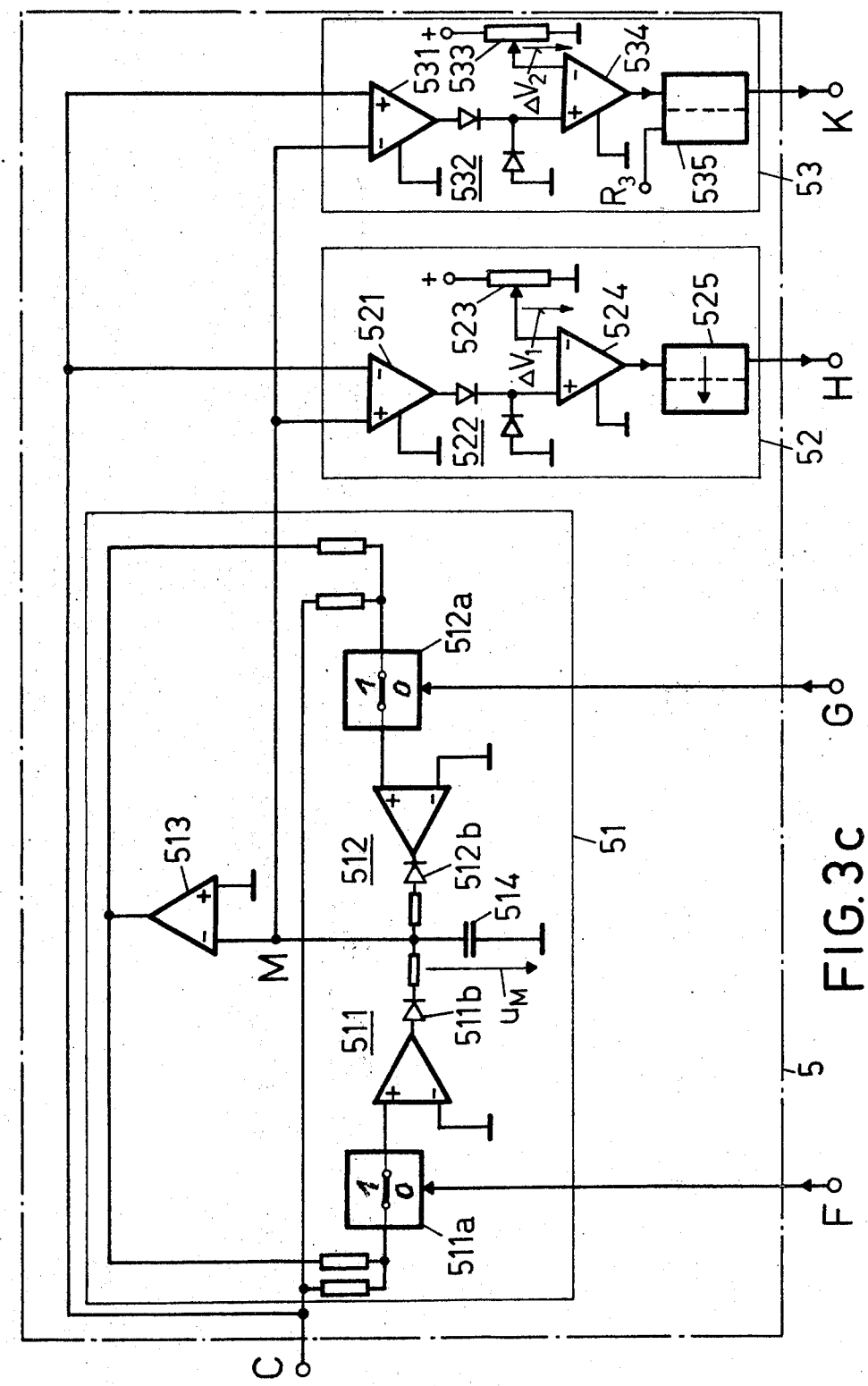
FIG. 3c is a detailed circuit diagram of the extreme-value detector shown in FIG. 3b.

As shown in FIG. 3c, the two follow-up circuits 511 and 512 each hve a normally-closed switch 511a and 512a, respectively, controlled by outputs F and G of the control circuit 6. These switches are each of the input of a summing amplifier having at its output diode 511b or 512b, these diodes being of opposite polarity. The summing resistors of these amplifiers each receive the measuring signal $u_C$ and also via an inverter 513, the total output signal of the two amplifiers, superimposed in a storage capacitor 514, this total signal constituting the sequential signal $u_M$ referred to above. When both follow-up circuits are in operation, therefore, $u_M$ always becomes equal to $u_C$ after a small time lag, whereas the extreme values remain stored when the two circuits are disconnected.

The two detectors 52 and 53 each contain two differential amplifiers 521, 524 and 531, 534, of which the first in each case, in conjunction with a diode combination 522 or 532 on the output side, produces a positive signal only when $u_C$ is smaller or greater than $u_M$. The inputs of the differential amplifiers 521 and 531 are each connected to points C and M with their respective polarities reversed. The differential amplifiers 524 and 534, together with their associated potentiometers 523 and 533, serve to introduce minimum differences $\Delta V_1$ and $\Delta V_2$ respectively. Detection of descent or ascent becomes effective when these differences are reached. The output of the descent detector is generated by a monostable flip flop 525 with a vanishingly small inherent reset time, while that of the ascent detector is formed by a bistable flip flop 535 with reset input $R_3$.

Secondary-rise detector 5 and control circuit 6 together form the circuit section 56 shown in FIG. 2.

Figure 3D:
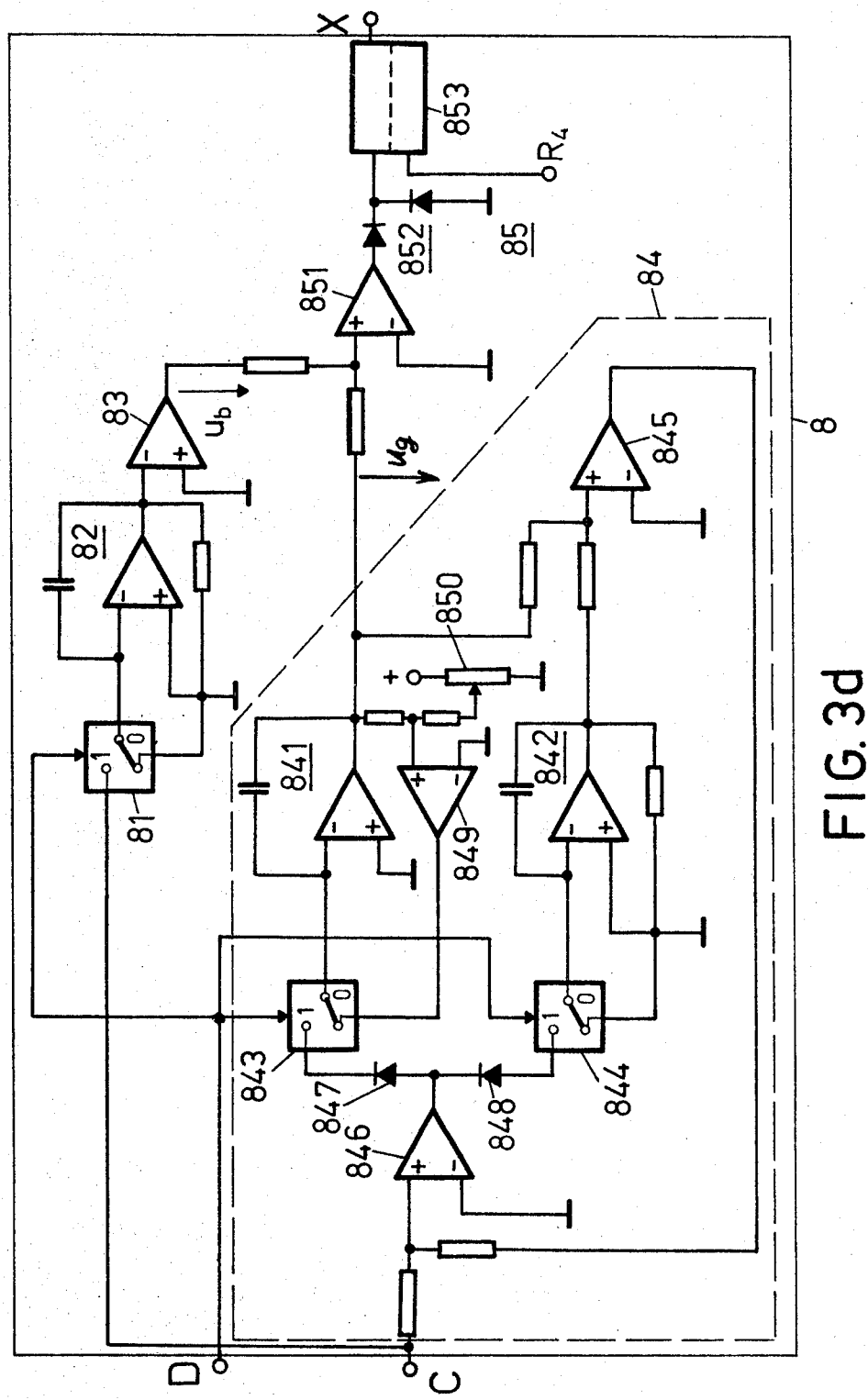
FIG. 3d is a detailed circuit diagram of a part of the circuit with the integrator for generating the replica signal, the limit-value emitter and the comparator stage.

The replica-signal limit-value switch 8 is shown separately in FIG. 3d. It comprises, among other things, an integrator 82 with a switch 81 controllable from point D as shown in FIG. 3a in the input circuit, and an inverter 83 on the output side, the output of which yields the replica signal $u_b$ corresponding to the current $i$.

The replica-signal limit-value switch 8 further comprises a limit-value emitter 84 and a comparator stage 85. The limit-value emitter 84 comprises essentially a follow-up circuit, controlled by $u_C$, with a summing amplifier 846 and two separate storage elements 841 and 842 for following the ascent an descent, respectively, of $u_C$. This allocation of the two storage elements is effected by the diodes of reversed polarity 847 and 848 in the input circuits of the integrators forming these storage elements.

The output quantities of the two storage elements are superimposed in a summing amplifier 845 and yield the negative value of the measuring signal $u_C$ at the output of summing amplifier 845, and hence at the corresponding summing resistor of amplifier 846. The follow-up control circuit is thus completed.

At the beginning of the time for which the limit value is exceeded, the two storage elements are connected to the circuit by switches 843 and 844, which are linked to point D. When switches 81, 843 and 844 are open, the associated integrators or storage elements are at a defined initial potential, integrator 82 and storage element 842 being at zero potential, whereas storage element 841 is at a positive initial value which is adjustable with a potentiometer 850, and via an auxiliary circuit, with summing amplifier 849, and which corresponds to the switch-on potential of limit-value switch 2.

The result of arranging for these defined initial states of the said integrators and storage elements is that one receives not only the desired independence of the replica signal $u_b$ and limit-value signal $u_g$ — the latter at the output of the limit-value emitter 84 — from the absolute current values present in the on-state, but also a particular advantage if $u_C$ exceeds the limit value for only a short time. In the case last mentioned, for example, failure to adjust the positive initial positive potential of storage element 841 would give rise to the difficulty that the limit-value signal $u_g$ can no longer attain the measuring signal $u_C$ within the possibly very short time the limit value is exceeded, owin to the inertia of the follow-up circuit. Owing to prior adjustment, however, the follow-up process begins with a potential which already corresponds to the instantaneous value of $u_C$, so that in practice the inertia of the follow-up circuit is not perceptible.

Since the storage elements are allocated selectively to following the rise and descent of $u_C$, the limit-value signal $u_g$ at all times represents the sum of the preceding maximum values of $u_C$, as is necessary with regard to the short-circuit detection procedure already described.

The comparator stage 85 consists of summing amplifier 851 to which is fed the replica signal $u_b$ and the limit-value signal, inverted with respect to $u_C$, and also of the final bistable flip flop 853 with reset input $R_4$, the output of which corresponds to point X in FIG. 2.

Figure 4:
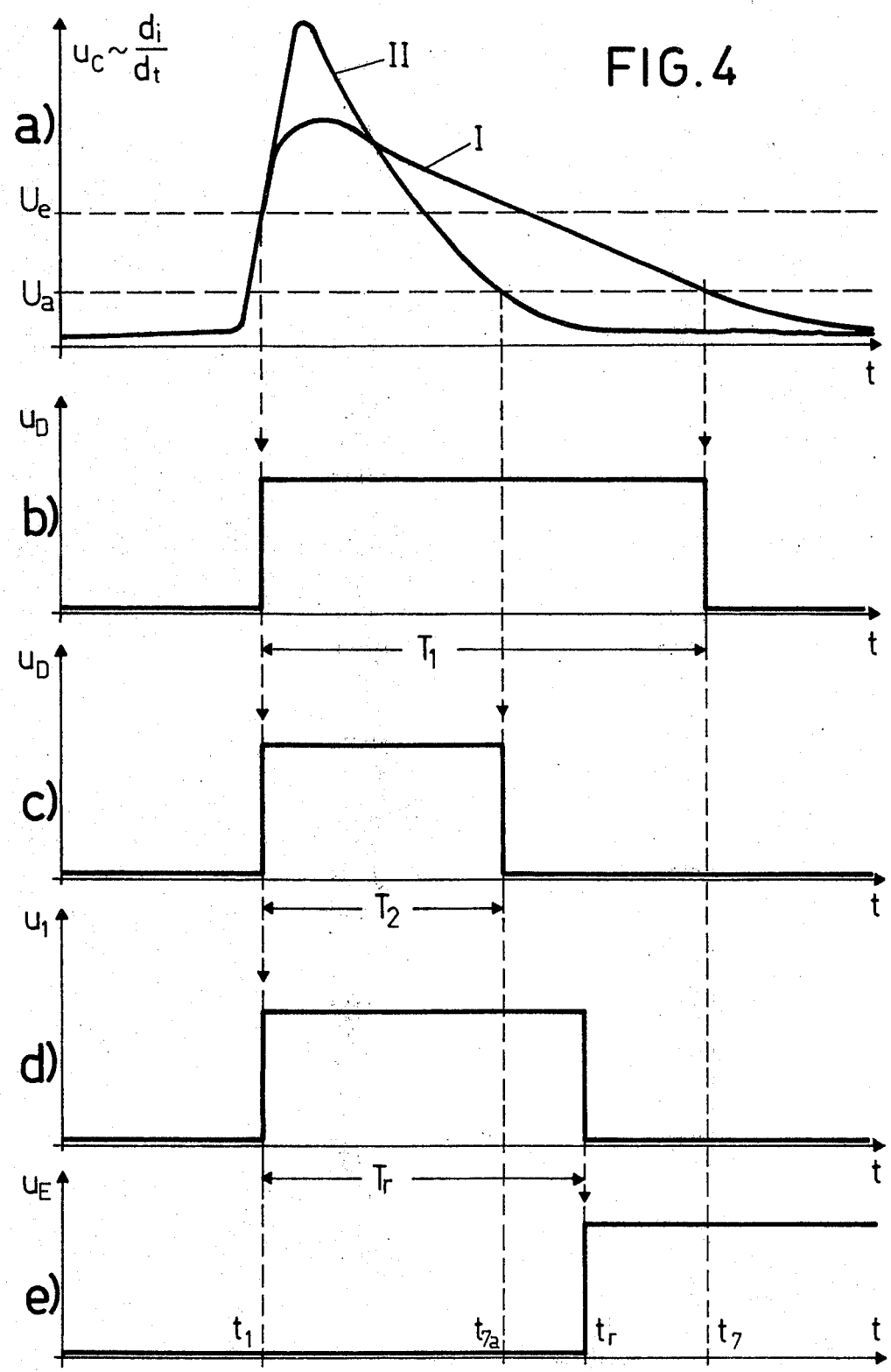
FIG. 4 is a multiple time diagram illustrating the operating principle of the limit-value switch with time-comparator stage.

The following remarks refer to FIG. 4, which illustrates the signal pattern of the part of the circuit shown in FIG. 3a.

Line 1) shows two different curves $u_C$; a first curve I with a lower maximum and relatively flat descent, and a second curve II with a high maximum and steeper descent. The former corresponds to a short circuit, because there is no secondary rise. The potentials of the switch-on and switch-off points of the limit-value switch 2 are denoted $U_e$ and $U_a$, respectively. In the case of this example, therefore, $u_C$ is compared with two limit values, namely the higher ascent limit value $U_e$ and the lower descent limit value $U_a$. Line b) shows the duration $T_1$ of the "limit value exceeded" signal $u_D$ between times $t_1$ and $t_7$ for curve I, while line c) shows the time $T_2$ during which the limit value is exceeded between $t_1$ and $t_{7a}$ for curve II. Line d) indicates the behavior of the output voltage $u_1$ of time-comparator stage 3 with the set reference interval $T_r$. This interval ends later than $T_2$ but earlier than $T_1$ so that, in the case of curve I, at the end of $T_r$, i.e., from moment $t_r$, an indication of a short circuit in the form of a voltage $u_E$ is produced via AND gate 4 and flip flop 41.

Figure 5:
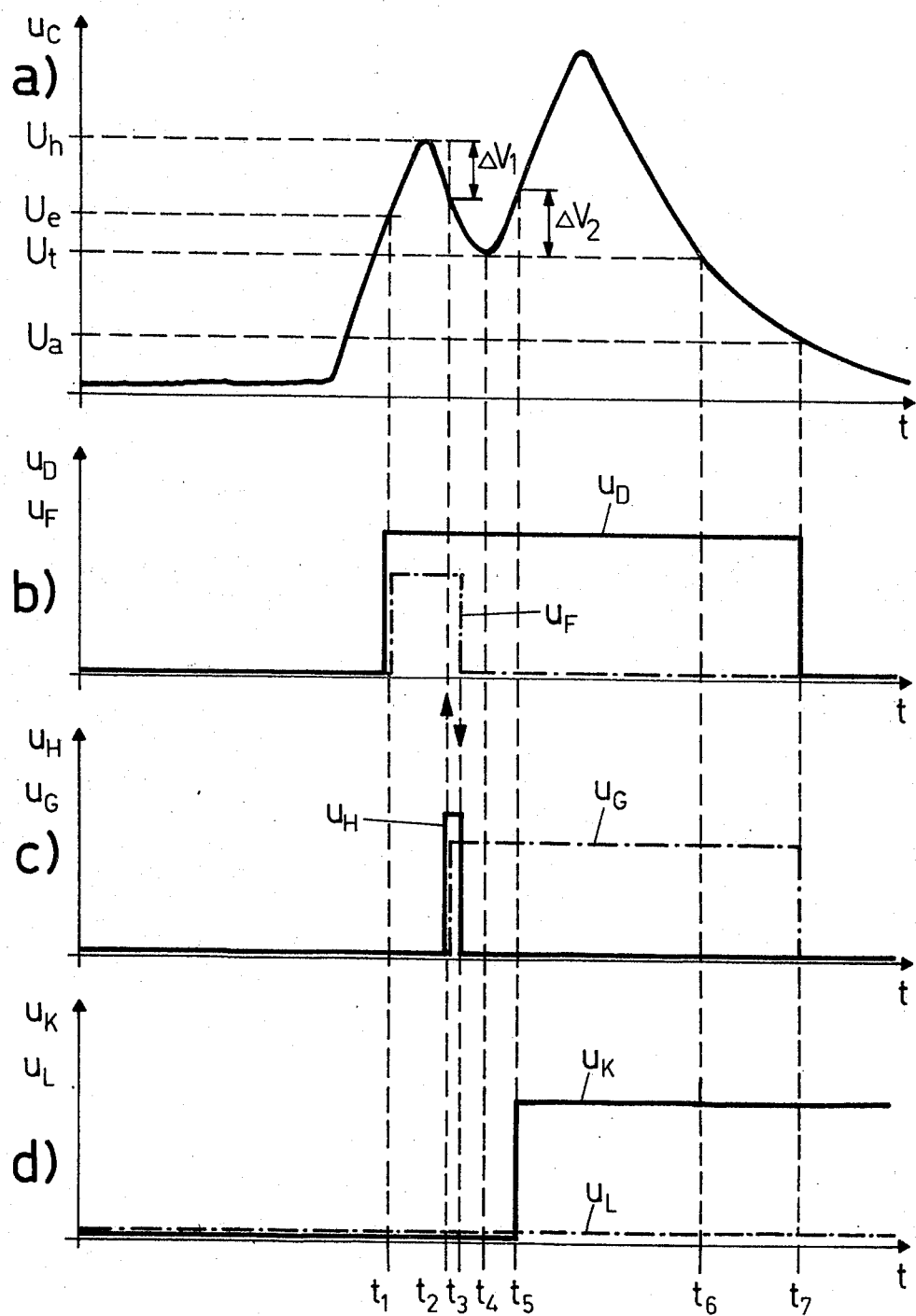
FIG. 5 is a multiple time diagram illustrating the operating principle of the extreme-value detector with its control circuit.

The manner of operation of the parts of the circuit shown in FIG. 3b and FIG. 3c is illustrated in FIG. 5.

Line 1) shows a curve of $u_C$ with a secondary rise after a first maximum $U_h$ and a minimum $U_t$. At $t_1$ the switch-on point $U_e$ of the limit-value switch is exceeded, and hence the "limit value exceeded" signal $u_D$ indicated in line b) is initiated. At the same time, point F carries the output of the AND gate 61, as shown in FIG. 3b, in the form of an affirmative signal $u_F$, thus preventing $u_M$ from following the descent. This becomes effective when $U_h$ is passed, and at time $t_2$ causes the descent to be detected with affirmative signal $u_H$, as shown in line c), at point H in FIG. 3b. After a delay — shown in exaggerated form in line b) — the descent is again followed from time $t_3$, so that $u_H$ is again also negated, i.e., drops to zero. The first rise remains stored by flip flop 63, however, and allows the rise taking place after $U_t$ to be identified as a secondary rise in the required sense of monitoring the short-circuit indication via the AND gate 62 of FIG. 3b.

Line c) of FIG. 5 also shows the affirmative signal $u_G$ at the output of flip flop 63 which continues from the moment the descent is detected at $t_2$ until it is reset (not shown), and prevents the ascent from being followed. The secondary rise is detected at time $t_5$ with affirmative signal $u_K$, which similarly persists in ascent detector 53 until flip flop 535 is reset (not shown), and passes via the now ready AND gate 7, i.e., blocks the short-circuit indication arriving via E beyond time $t_6$, at which the positive difference voltage $u_C - u_M$ disappears. The overcurrent signal $u_L$ shown in line d), together with $u_K$, thus remains negated beyond time $t_7$.

Figure 6:
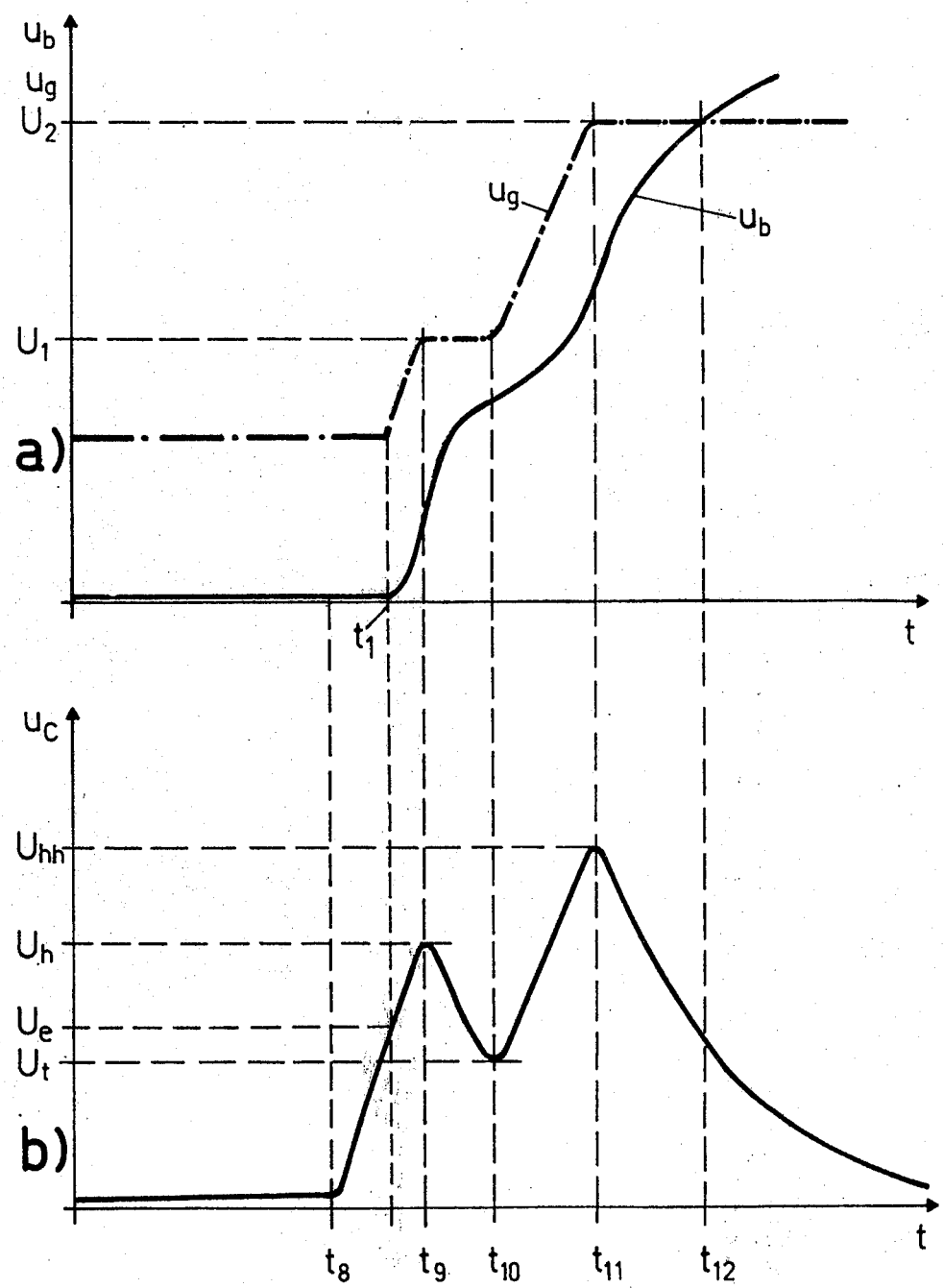
FIG. 6 is a multiple time diagram illustrating the operating principle of the replica-signal generator and of the limit-value emitter with its succeeding comparator stage.

The operating principle of the replica-signal limit-value switch 8 in FIG. 2 is illustrated in FIG. 6.

The curves of the replica signal $u_b$ and the limit-value signal $u_g$ are shown in line a), while line b) shows the curve of $u_C$ corresponding to line a) of FIG. 5.

The ascent of $u_C$ begins at time $t_8$, whereas $u_g$ does not start to follow the ascent of $u_C$ until time $t_1$ according to FIG. 4, when $u_C$ exceeds the limit value $U_e$. Owing to the prior adjustment of the storage element referred to earlier, $u_g$ starts with a value corresponding to the already finite value of $u_C$. The integration of $u_C$ to generate the replica signal $U_b$ commences at the same time.

At $t_9$, $u_C$ reaches its first maximum $U_h$ and $u_g$ completes its first step with limit value $U_1$, which remains stored until $u_C$ arrives at its first minimum $U_t$ at time $t_{10}$.

$u_g$ then continues to follow $u_C$ until the latter reaches a second maximum $U_{hh}$ corresponding to the second limit value $U_2$ or $u_g$.

Owing to the comparatively high maximum rate of rise of the first ascent of $u_C$, this operating condition is initially also allocated a comparatively high limit value $U_1$ which is not reached by the replica signal $u_b$ until time $t_{10}$. To this extent, therefore, this condition is identified as being still acceptable.

The second ascent of $u_b$ in accordance with i then follows with a relatively small increase in rate of rise between $t_{10}$ and $t_{11}$ corresponding to the difference between the first minimum $U_t$ and the second maximum $U_{hh}$ of $u_C$. The second ascent of $u_b$ is thus comparatively slow, but continues to very much higher ultimate values, so that the second limit value $U_2$ is exceeded at time $t_{12}$ and hence, despite the secondary rise, short circuit is indicated.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method for the detection of short circuits in electrical installations, in particular on railway contact wires, comprising:
   generating a signal corresponding to the time derivative of the monitored current,
   comparing the generated current time derivative signal with a first limit value,
   generating, in case of the current time derivative signal exceeding the first limit value, a replica signal corresponding to the wave-form of the monitored current from the moment of the exceeding onwards,
   comparing the replica signal with at least one further limit value and
   providing a short circuit condition indication signal if the at least one further limit value is exceeded.

2. A method as claimed in claim 1, in which the replica signal is obtained through time integration of a signal corresponding to the time derivative of the monitored current, integration is commenced from a value independent of the monitored current and is initiated by the occurrence of the short-circuit probability criterion.

3. A method as claimed in claim 2, in which the time integration of the signal corresponding to the time derivative of the monitored current commences from an initial value zero of the integration.

4. A method as claimed in claim 2 comprising:
   generating a measuring signal corresponding to the time derivative of the monitored current,
   comparing the measuring signal with at least one limit value,
   determining the time for which the measuring signal exceeds a limit value,
   comparing the determined time with a preset reference interval,
   indicating a short circuit when the time for which the measuring signal exceeds the limit value also exceeds the time interval,
   checking the measuring signal for the occurrence of a decrease following an initial rise and for the occurrence of a secondary rise, and
   rendering ineffective with a blocking signal the indication of a short circuit caused when the time for which the measuring signal exceeds the limit value also exceeds the reference interval if the measuring signal undergoes a secondary rise and there is no indication of a short circuit because the replica signal has exceeded a limit value.

5. A method as claimed in claim 4, in which a sequential signal derived from the measuring signal is generated which follows the measuring signal when the latter first rises and then falls to a first minimum, and is held at this minimum, and the blocking signal is generated according to whether a preset difference between measuring signal and sequential signal is attained when the measuring signal rises again after the first minimum.

6. A method as claimed in claim 4, in which the sequential signal is held at the first maximum and when the difference between measuring signal and sequential signal is reached together with detection of the first rise of the measuring signal, the sequential signal is released in order to follow the measuring signal until the first minumum.

7. A method as claimed in claim 1, in which the replica signal used to obtain indication of a short circuit is compared with a limit value which is dependent in the same sense on the rate of rise of the monitored current following the occurrence of the short-circuit probability criterion.

8. A method as claimed in claim 7, in which a limit-value signal rising in steps with respect to time is generated as a function of a stepped ascent of the monitored current with the height of the steps of the limit-value signal being dependent in the same sense on the maximum rates of rise of the monitored current following the occurrence of the short-circuit probability criterion.

9. A method as claimed in claim 1 comprising:
   generating a measuring signal corresponding to the time derivative of the monitored current,
   comparing the measuring signal with at least one limit value,
   determining the time for which the measuring signal exceeds a limit value,
   comparing the determined time with a preset reference interval,
   indicating a short circuit when the time for which the measuring signal exceeds the limit value also exceeds the time interval,
   checking the measuring signal for the occurrence of a decrease following an initial rise and for the occurrence of a secondary rise, and
   rendering ineffective with a blocking signal the indication of a short circuit caused when the time for which the measuring signal exceeds the limit value also exceeds the reference interval if the measuring signal undergoes a secondary rise and there is no indication of a short circuit because the replica signal has exceeded a limit value.

10. A method as claimed in claim 9, in which a sequential signal derived from the measuring signal is generated which follows the measuring signal when the latter first rises and then falls to a first minimum, and is held at this minimum, and the blocking signal is generated according to whether a preset difference between measuring signal and sequential signal is attained when the measuring signal rises again after the first minimum.

11. A method as claimed in claim 9, in which the sequential signal is held at the first maximum and when the difference between measuring signal and sequential signal is reached together with detection of the first rise of the measuring signal, the sequential signal is released in order to follow the measuring signal until the first minimum.

12. A method as claimed in claim 1 in which the short-circuit indication caused when the replica signal exceeds a limit value, together with a further short-circuit indication caused when the length of time for which a signal corresponding to the time derivative of the monitored current exceeds a limit value also exceeds a preset reference interval, are coupled by way of OR gating means to form a resultant over-current signal.

13. A method as claimed in claim 1, in which the short-circuit indication caused when the replica signal exceeds a limit value is coupled by way of AND gating means with a negated current time derivative re-increase or secondary-rise detection signal to form a valid overcurrent signal.

14. A method as claimed in claim 1, in which the short-circuit indication caused when the replica signal exceeds a limit value is coupled by way of OR gating means with a further shot-circuit indication caused when a signal corresponding to the time derivative of the monitored current exceeds a limit value to form a resultant over-current signal.

15. A monitoring circuit for the detection of short circuits in electrical installations, in particular on railway contact wires, comprising:
 a measuring-signal emitter with a current-differentiating element, connected to a current path of the installation to be monitored,
 a limit-value switch which changes to the on-state when the measuring signal exceeds a limit value,
 an integrator connected to the output of the measuring-signal emitter and having a switch which can be switched by the output of the limit-value switch between an off-state which sets the integrator to a preset initial value, and an on-state which starts the integration, according to whether the measuring signal has exceeded a limit value,
 a limit-value emitter having its input actively connected to the output of the measuring-signal emitter, and supplying at its output at least one limit value dependent on a maximum value of the measuring signal and in the same sense,
 a comparator stage connected to the output of the integrator and to the output of the limit-value emitter and providing at its output an indication of a short circuit when the time integral of the measuring signal exceeds the limit value.

16. Circuitry as claimed in claim 15, in which the limit-value emitter incorporates at least one storage element for the maximum value of the measuring signal.

17. Circuitry as claimed in claim 16, in which the limit-value emitter incorporates a signal-sequence circuit which receives the measuring signal and includes two selective storage devices for following the ascent and descent of the measuring signal, and the output of the selective storage device for following the ascent forms the output of the limit-value emitter.

18. Circuitry as claimed in claim 17, in which the selective storage devices are each provided with a switch controllable from the output of the limit-value switch, such that these switches, when in their switching state before the measuring signal exceeds a limit value, hold the outputs of the storage devices at a preset initial value, and when in their switching state after the measuring signal has exceeded a limit value, switch the outputs of the storage devices via a summing element to the signal-sequence circuit.

19. Circuitry as claimed in claim 18, in which the storage device responsible for following the ascent of the measuring signal is provided with an initial value relating to the switching state before the measuring signal exceeds a limit value with the initial value corresponding to the limit value which causes the storage device to be connected to the signal-sequence circuit.

20. Circuitry as claimed in claim 15, in which the output of the comparator stage is connected disjunctively to the output of a limit-value switch monitoring the rate of rise of the current as to whether it exceeds a preset limit value, to form an output indicating an overcurrent.

21. Circuitry as claimed in claim 15, in which the output of the comparator stage is connected disjunctively to the output of an overtime switch which monitors a signal corresponding to the time derivative of the monitored current as to whether the time for which this signal exceeds a limit value also exceeds a reference interval, to form an output indicating an overcurrent.

22. Circuitry as claimed in claim 15, in which the output of the comparator stage is connected conjunctively to a negated output of a secondary-rise detector monitoring the behavior of the signal corresponding to the time derivative of the monirored current, to form an output indicating an overcurrent.

* * * * *